US010297041B2

(12) United States Patent
Ahn et al.

(10) Patent No.: US 10,297,041 B2
(45) Date of Patent: May 21, 2019

(54) APPARATUS AND METHOD OF RECOGNIZING USER POSTURES

(71) Applicant: Korea Electronics Technology Institute, Seongnam-si, Gyeonggi-do (KR)

(72) Inventors: Yang Keun Ahn, Seoul (KR); Kwang Mo Jung, Goyang-si (KR); Chan Gyu Kim, Pyeongtaek-si (KR)

(73) Assignee: KOREA ELECTRONICS TECHNOLOGY INSTITUTE, Seongna,-si, Gyeonggi-Do (KR)

( * ) Notice: Subject to any disclaimer, the term of this patent is extended or adjusted under 35 U.S.C. 154(b) by 185 days.

(21) Appl. No.: 15/484,258

(22) Filed: Apr. 11, 2017

(65) Prior Publication Data

US 2017/0294029 A1    Oct. 12, 2017

(30) Foreign Application Priority Data

Apr. 11, 2016    (KR) .................. 10-2016-0044171

(51) Int. Cl.
G06K 9/00 (2006.01)
G06T 7/73 (2017.01)
G06K 9/46 (2006.01)
G06K 9/62 (2006.01)

(52) U.S. Cl.
CPC ............ *G06T 7/73* (2017.01); *G06K 9/00362* (2013.01); *G06K 9/00369* (2013.01); *G06K 9/468* (2013.01); *G06K 9/6211* (2013.01); *G06T 2207/10012* (2013.01); *G06T 2207/30196* (2013.01)

(58) Field of Classification Search
None
See application file for complete search history.

(56) References Cited

U.S. PATENT DOCUMENTS

| 6,181,343 | B1* | 1/2001 | Lyons ..................... A63F 13/10 715/850 |
| 6,195,104 | B1* | 2/2001 | Lyons ................ H04N 5/23219 345/473 |
| 8,428,311 | B2* | 4/2013 | Dariush ............. G06K 9/00369 382/115 |
| 9,165,199 | B2* | 10/2015 | Zhu .................... G06K 9/00201 |
| 9,220,444 | B2* | 12/2015 | Russell ................ A61B 5/0205 |
| 9,463,570 | B2* | 10/2016 | Kim ....................... B25J 9/0006 |
| 9,477,880 | B2* | 10/2016 | Nabatame .......... G06K 9/00335 |
| 9,626,878 | B2* | 4/2017 | Rekimoto ............. G09B 19/00 |
| 9,639,746 | B2* | 5/2017 | Bulzacki ............ G06K 9/00342 |
| 9,904,845 | B2* | 2/2018 | Dariush ............. G06K 9/00369 |
| 2009/0175540 | A1* | 7/2009 | Dariush ............. G06K 9/00362 382/195 |
| 2011/0054870 | A1* | 3/2011 | Dariush .................. G06F 3/011 703/11 |
| 2012/0245492 | A1* | 9/2012 | Lee ....................... A61B 5/1114 600/595 |

(Continued)

*Primary Examiner* — Feng Niu
(74) *Attorney, Agent, or Firm* — Hauptman Ham, LLP

(57) ABSTRACT

Provided is an apparatus for recognizing user postures. The apparatus recognizes detailed postures such as a stand posture, a bending forward posture, a bending knees posture, a tilt right posture, and a tilt left posture, based on a variation between body information at a previous time and body information at a current time.

7 Claims, 9 Drawing Sheets

(56) References Cited

U.S. PATENT DOCUMENTS

| | | | | |
|---|---|---|---|---|
| 2014/0093851 A1* | 4/2014 | Kim | ................... | A61B 5/1116 |
| | | | | 434/247 |
| 2014/0307927 A1* | 10/2014 | Folmer | ............... | A61B 5/7267 |
| | | | | 382/107 |
| 2014/0358475 A1* | 12/2014 | Boulkenafed | ......... | G01B 21/16 |
| | | | | 702/152 |
| 2015/0092980 A1* | 4/2015 | Folmer | ............... | A61B 5/4866 |
| | | | | 382/103 |
| 2015/0139505 A1* | 5/2015 | Vladimirov | ............ | G06T 7/246 |
| | | | | 382/107 |
| 2015/0207986 A1* | 7/2015 | Kimura | ............. | G06K 9/00369 |
| | | | | 348/364 |
| 2016/0175650 A1* | 6/2016 | Sato | .................. | A63B 69/3632 |
| | | | | 702/151 |
| 2016/0175674 A1* | 6/2016 | Hayaishi | ............... | A63B 71/06 |
| | | | | 473/223 |
| 2016/0259969 A1* | 9/2016 | Nabatame | ......... | G06K 9/00335 |
| 2016/0328604 A1* | 11/2016 | Bulzacki | ........... | G06K 9/00335 |

\* cited by examiner

APPARATUS AND METHOD OF RECOGNIZING USER POSTURES

CROSS-REFERENCE TO RELATED APPLICATIONS

This application claims priority under 35 U.S.C. § 119 to Korean Patent Application No. 10-2016-0044171, filed on Apr. 11, 2016, the disclosure of which is incorporated herein by reference in its entirety.

TECHNICAL FIELD

The present invention relates to an apparatus and method of recognizing user postures.

BACKGROUND

Generally, skiing is sports which freely fall down a snow-piled slope by using a ski plate, ski boots, a pole shaft, and a binding where a ski plate and ski boots are combined with each other.

In order to go skiing on a snow-piled slope, basic actions of skiing should be learned, and for example, various skiing postures such as a turn posture of turning a direction or a stop posture of stopping running skis should be learned.

In order to learn such skiing postures, much time is needed, and particularly, in an environment where four seasons are distinct like Korea, since the skiing postures can be learned in only winter, more time is expended in learning the skiing postures.

Therefore, research is being actively made on skiing simulators for learning the skiing postures without time and a space being limited. However, in a case of recognizing user postures by using a skiing simulator developed to date, a skiing posture of a user is schematically recognized based on only left and right tilt information about a ski plate measured by a tilt sensor, and for this reason, it is unable to recognize detailed skiing postures of a whole user body.

SUMMARY

Accordingly, the present invention provides a user posture recognizing apparatus and method for recognizing detailed postures of a whole user body.

In one general aspect, a method of recognizing user postures includes: receiving body information including a two-dimensional (2D) coordinate value "H" representing a head position of a user, a three-dimensional (3D) coordinate value "M" representing a body middle position of the user, a 2D coordinate value "C" representing a center position between a left ankle position and a right ankle position of the user, a distance value "HM" from the head position of the user to the body middle position of the user, a distance value "HC" from the head position of the user to the center position between the left ankle position and the right ankle position of the user, and a distance value "MC" from the body middle position of the user to the center position "C" between the left ankle position "L" and the right ankle position "R" of the user; and recognizing a posture of the user, based on a variation between body information input at a previous time and body information input at a current time.

In another general aspect, an apparatus for recognizing user postures includes: an image processor configured to extract body information from an image input through a three-dimensional (3D) camera, the body information including a two-dimensional (2D) coordinate value "H" representing a head position of a user, a 3D coordinate value "M" representing a body middle position of the user, a 2D coordinate value "C" representing a center position between a left ankle position and a right ankle position of the user, a distance value "HM" from the head position of the user to the body middle position of the user, a distance value "HC" from the head position of the user to the center position between the left ankle position and the right ankle position of the user, and a distance value "MC" from the body middle position of the user to the center position "C" between the left ankle position "L" and the right ankle position "R" of the user; and a posture recognizer configured to sequentially receive body information at a previous time and body information at a current time from the image processor and recognize a posture of the user, based on a variation between the body information input at the previous time and the body information input at the current time.

Other features and aspects will be apparent from the following detailed description, the drawings, and the claims.

DETAILED DESCRIPTION OF EMBODIMENTS

Figure 1:
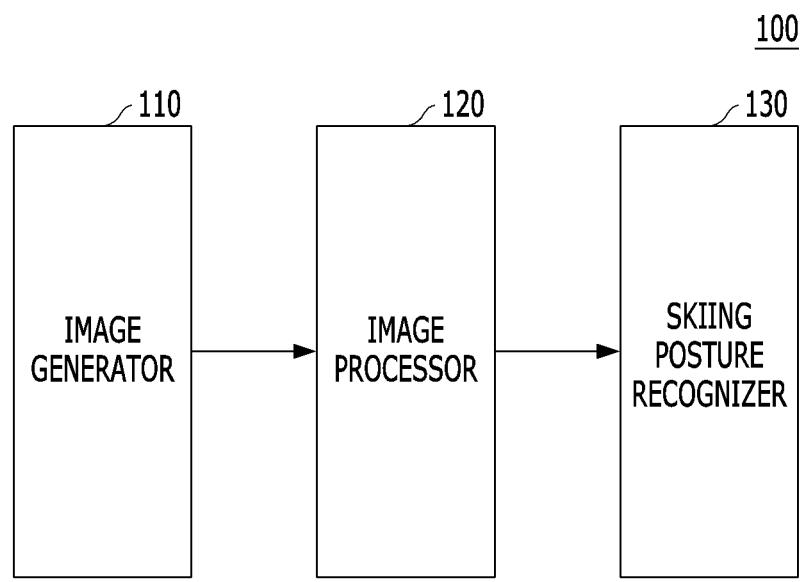
FIG. 1 is a block diagram illustrating main elements of a user posture recognizing apparatus according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

Figure 2:
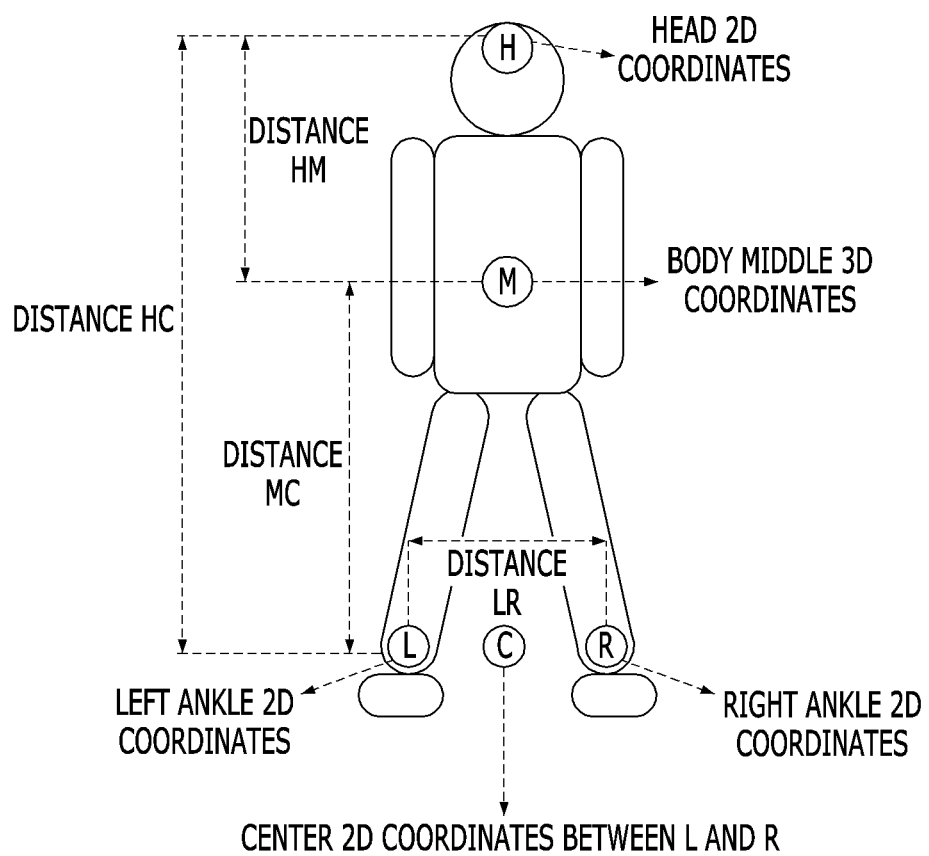
FIG. 2 is a diagram for describing user body information generated by an image processor illustrated in FIG. 1.

FIG. 1 is a block diagram illustrating main elements of a user posture recognizing apparatus 100 according to an embodiment of the present invention. FIG. 2 is a diagram for describing user body information generated by an image processor illustrated in FIG. 1.

Referring to FIG. 1, the user posture recognizing apparatus 100 according to an embodiment of the present invention may recognize a skiing posture without being limited.

The user posture recognizing apparatus 100 according to an embodiment of the present invention may include an image generator 110, an image processor 120, and a posture recognizer 130.

The image generator 110 may be an element for photographing a user to generate a user image, and for example, may be a three-dimensional (3D) camera. The 3D camera may be configured by a combination of a depth camera, generating a depth image having a depth value, and an RGB camera for generating an RGB image having an RGB value. Here, the depth camera may be an infrared camera.

The image processor 120 may perform an image processing operation such as a rendering operation to extract body information about a user necessary for recognizing a skiing posture of the user by using the user image (i.e., the RGB image and the depth image) generated by the image generator 110. The user body information extracted by the image processor 120 is as illustrated in FIG. 2.

As illustrated in FIG. 2, the user body information may include a two-dimensional (2D) coordinate value "H(x, y) or H" representing a head position of the user, a 3D coordinate value "M(x, y, z) or M" representing a body middle position of the user, a 2D coordinate value "L(x, y) or L" representing a left ankle position of the user, a 2D coordinate value "R(x, y) or R" representing a right ankle position of the user, and a 2D coordinate value "C(x, y) or C" representing a center position between the left ankle position and the right ankle position of the user, in a 3D coordinate system.

In addition, the user body information may further include a distance value "HM" from a head position "H" of the user to a body middle position "M" of the user, a distance value "HC" from the head position "H" of the user to a center position "C" between a left ankle position "L" and a right ankle position "R" of the user, a distance value "MC" from the body middle position "M" of the user to the center position "C" between the left ankle position "L" and the right ankle position "R" of the user, and a distance value "LR" from the left ankle position "L" of the user to the right ankle position "R" of the user, in the 3D coordinate system.

The posture recognizer 130 may recognize a posture (for example, a skiing posture) of the user, based on the user body information extracted by the image processor 120. Here, the skiing posture of the user recognized by the posture recognizer 120 according to an embodiment of the present invention may include a stand posture, a bending forward posture, a bending knees posture, a tilt right posture, and a tilt left posture.

Hereinafter, a skiing posture recognizing operation performed by the posture recognizer 130 will be described in detail with reference to FIGS. 3 to 9.

Figure 3:
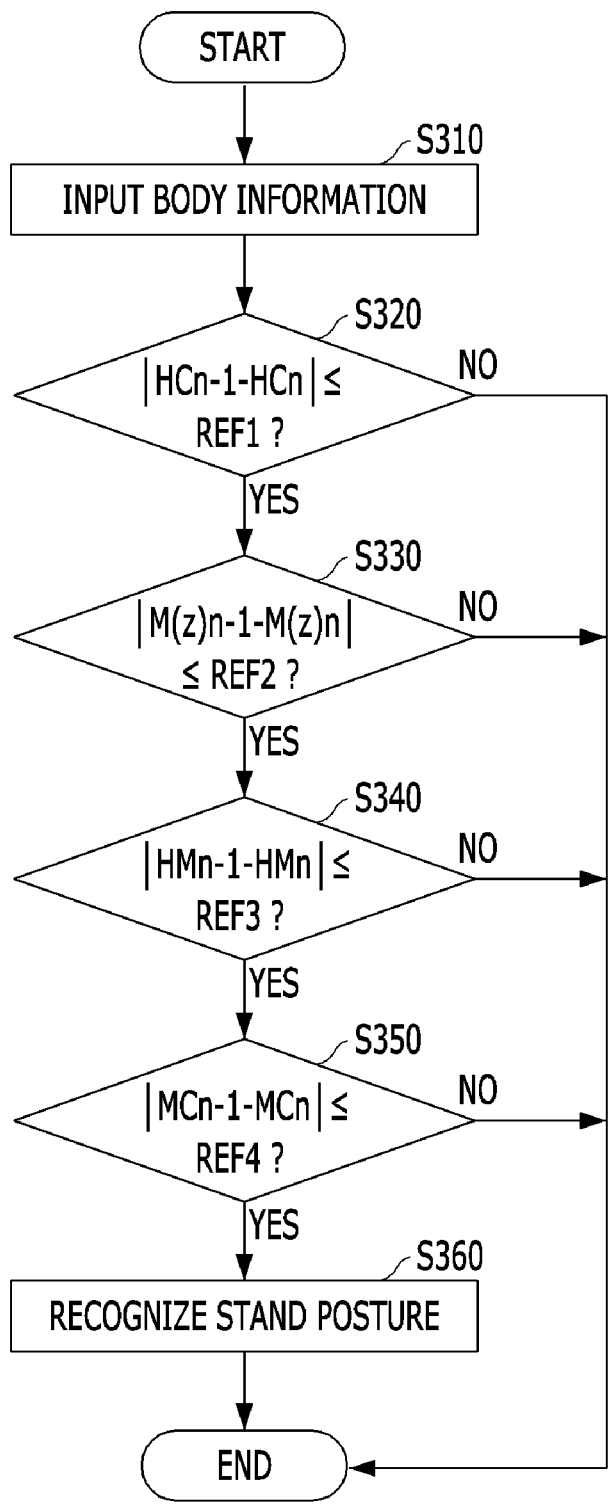
FIG. 3 is a flowchart illustrating a stand posture recognizing operation performed by a posture recognizer illustrated in FIG. 1.

FIG. 3 is a flowchart illustrating a stand posture recognizing operation performed by the posture recognizer illustrated in FIG. 1. In the drawing and the following description, a subscript "n−1" represents a previous time, and a subscript "n" represents a current time immediately after the previous time.

Referring to FIG. 3, the stand posture may be recognized based on a variation between body information at a previous time and body information at a current time.

In detail, first, in step S310, the body information at the previous time and the body information at the current time may be sequentially input in units of one image frame.

Subsequently, in step S320, whether an absolute value of a difference value between $HC_{n-1}$ at the previous time and $HC_n$ at the current time is equal to or less than a first reference value "REF1" may be determined. Here, the first reference value "REF1" may be a constant value representing an allowable error of HC which is predetermined. When the absolute value does not satisfy a condition of step S320, it may be determined that a user posture is not the stand posture, and the stand posture recognizing operation may end.

Subsequently, in step S330, when the condition of step S320 is satisfied, whether an absolute value "$|M_{n-1}-M_n|$" of a difference value between a z coordinate value "$M_{n-1}(z)$" of $M_{n-1}$ at the previous time and a z coordinate value "$M_n(z)$" of $M_n$ at the current time is equal to or less than a second reference value "REF2" may be determined. Here, the second reference value "REF2" may be a constant value which is predetermined within a total depth range (or a gray scale range) expressible in a Z-axis direction (a direction of a camera or a vertical direction of an image). When the absolute value "$|M_{n-1}-M_n|$" does not satisfy a condition of step S330, it may be determined that the user posture is not the stand posture, and the stand posture recognizing operation may end.

Subsequently, in step S340, when the condition of step S330 is satisfied, whether an absolute value "$|HM_{n-1}-HM_n|$" of a difference value between $HM_{n-1}$ at the previous time and $HM_n$ at the current time is equal to or less than a third reference value "REF3" may be determined. Here, the third reference value "REF3" may be a constant value representing an allowable error of HM which is predetermined. When a condition of step S340 is not satisfied, it may be determined that the user posture is not the stand posture, and the stand posture recognizing operation may end.

Subsequently, in step S350, when the condition of step S340 is satisfied, whether an absolute value "$|MC_{n-1}-MC_n|$" of a difference value between $MC_{n-1}$ at the previous time and $MC_n$ at the current time is equal to or less than a fourth reference value "REF4" may be determined. Here, the fourth reference value "REF4" may be a constant value representing an allowable error of MC which is predetermined. When a condition of step S350 is not satisfied, it may be determined that the user posture is not the stand posture, and the stand posture recognizing operation may end.

Figure 6A:
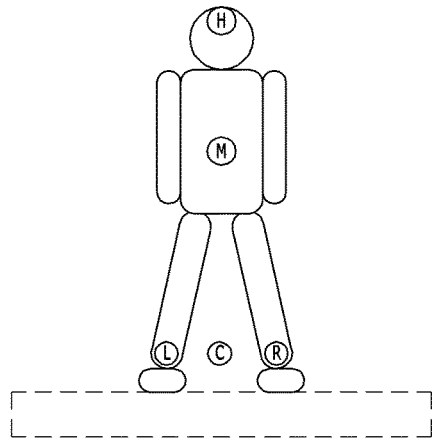
FIGS. 6A, 6B and 6C are a diagram schematically illustrating a stand posture, a bending forward posture, and a bending knees posture recognized by the posture recognizer illustrated in FIG. 1.

Subsequently, in step S360, when the condition of step S350 is satisfied, the user posture may be finally recognized as the stand posture illustrated in FIG. 6A, and a series of procedures of recognizing the stand posture may end.

Figure 4:
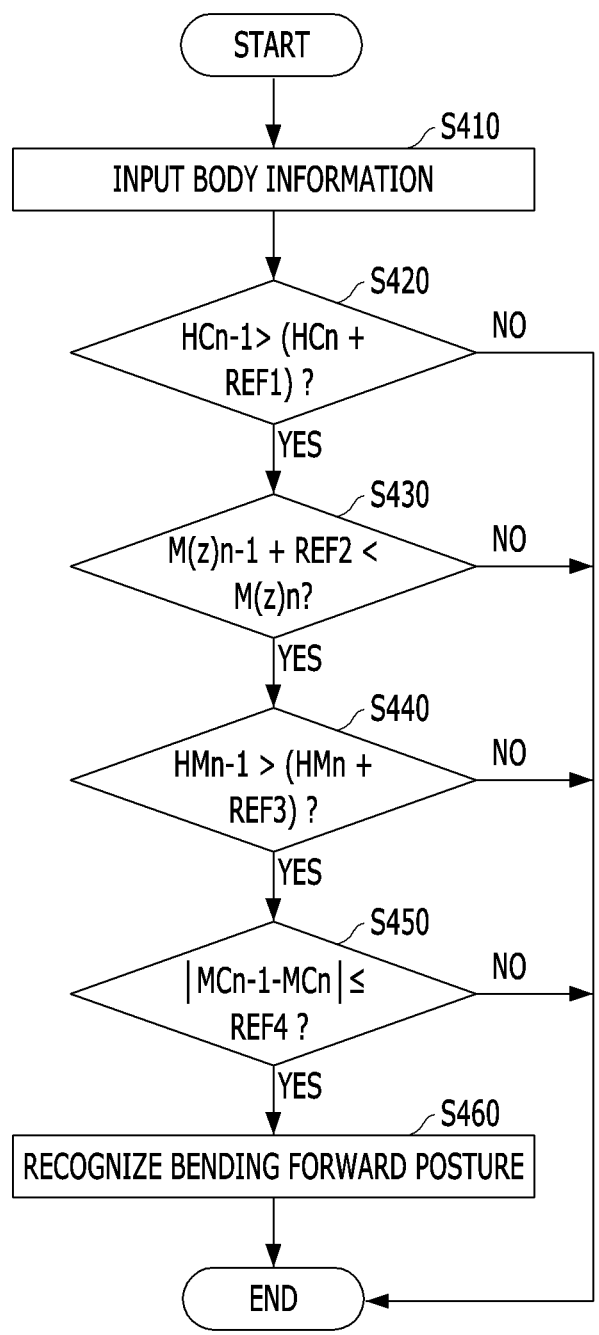
FIG. 4 is a flowchart illustrating a bending forward posture recognizing operation performed by the posture recognizer illustrated in FIG. 1.

FIG. 4 is a flowchart illustrating a bending forward posture recognizing operation performed by the posture recognizer illustrated in FIG. 1.

Referring to FIG. 4, in step S410, body information at a previous time and body information at a current time may be sequentially input in units of one image frame.

Subsequently, in step S420, whether a value "$HC_n+REF1$" obtained by summing $HC_n$ at the current time and the first reference value "REF1" is less than $HC_{n-1}$ at the previous time may be determined. When a condition of step S420 is not satisfied, it may be determined that a user posture is not a bending forward posture, and the bending forward posture recognizing operation may end.

Subsequently, in step S430, when the condition of step S420 is satisfied, whether a value "$M(z)_{n-1}+REF2$" obtained by summing a z coordinate value "$M(z)_{n-1}$" of $M_{n-1}$ at the previous time and the second reference value "REF2" is less than a z coordinate value "$M(z)_n$" of $M_n$ at the current time may be determined. When a condition of step S430 is not satisfied, it may be determined that the user posture is not the bending forward posture, and the bending forward posture recognizing operation may end.

Subsequently, in step S440, when the condition of step S430 is satisfied, whether a value "$M(z)_{n-1}+REF2$" obtained by summing $HM_n$ at the current time and the third reference value "REF3" is less than $HM_{n-1}$ at the previous time may be determined. When a condition of step S440 is not satisfied, it may be determined that the user posture is not the bending forward posture, and the bending forward posture recognizing operation may end.

Subsequently, in step S450, when the condition of step S440 is satisfied, whether an absolute value "$|MC_{n-1}-MC_n|$" of a difference value between $MC_{n-1}$ at the previous time and $MC_n$ at the current time is equal to or less than the fourth reference value "REF4" may be determined. When a condition of step S450 is not satisfied, it may be determined that the user posture is not the bending forward posture, and the bending forward posture recognizing operation may end.

Figure 6B:
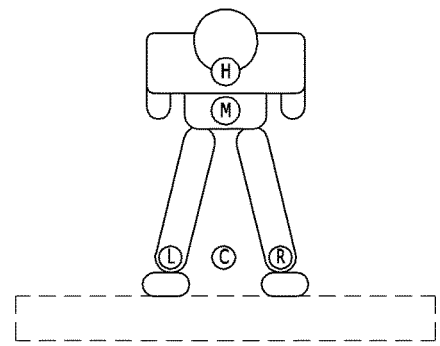

Subsequently, in step S460, when the condition of step S450 is satisfied, the user posture may be finally recognized as the bending forward posture illustrated in FIG. 6B, and a series of procedures of recognizing the bending forward posture may end.

Figure 5:
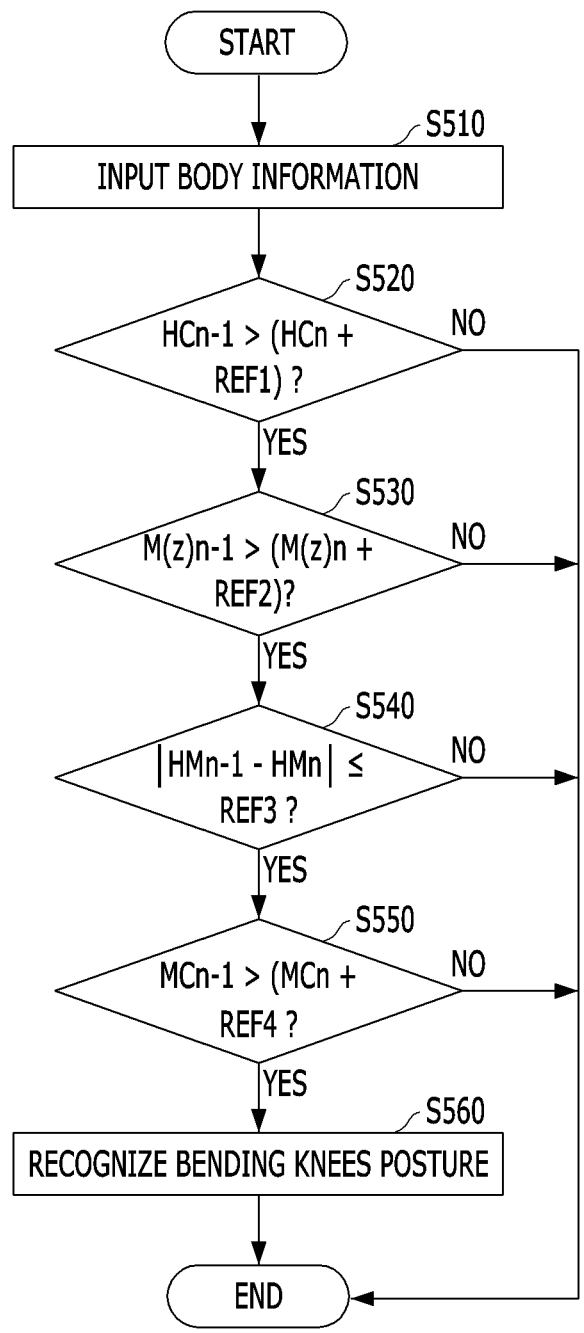
FIG. 5 is a flowchart illustrating a bending knees posture recognizing operation performed by the posture recognizer illustrated in FIG. 1.

FIG. 5 is a flowchart illustrating a bending knees posture recognizing operation performed by the posture recognizer illustrated in FIG. 1.

Referring to FIG. 5, in step S510, body information at a previous time and body information at a current time may be sequentially input in units of one image frame.

Subsequently, in step S520, whether a value "$HC_n+REF1$" obtained by summing $HC_n$ at the current time and the first reference value "REF1" is less than $HC_{n-1}$ at the previous time may be determined. When a condition of step S520 is not satisfied, it may be determined that a user posture is not a bending knees posture, and the bending knees posture recognizing operation may end.

Subsequently, in step S530, when the condition of step S520 is satisfied, whether a value obtained by summing a z coordinate value "$M(z)_n$" of $M_n$ at the current time and the second reference value "REF2" is less than a z coordinate value "$M(z)_{n-1}$" of $M_{n-1}$ at the previous time may be determined. When a condition of step S530 is not satisfied, it may be determined that the user posture is not the bending knees posture, and the bending knees posture recognizing operation may end.

Subsequently, in step S540, when the condition of step S530 is satisfied, whether an absolute value "$|HM_{n-1}-HM_n|$" of a difference value between $HM_{n-1}$ at the previous time and $HM_n$ at the current time is equal to or less than the third reference value "REF3" may be determined. When a condition of step S540 is not satisfied, it may be determined that the user posture is not the bending knees posture, and the bending knees posture recognizing operation may end.

Subsequently, in step S550, when the condition of step S540 is satisfied, whether a value "$MC_n+REF4$" obtained by summing $MC_n$ at the current time and the fourth reference value "REF4" is less than $MC_{n-1}$ at the previous time may be determined. When a condition of step S550 is not satisfied, it may be determined that the user posture is not the bending knees posture, and the bending knees posture recognizing operation may end.

Figure 6C:
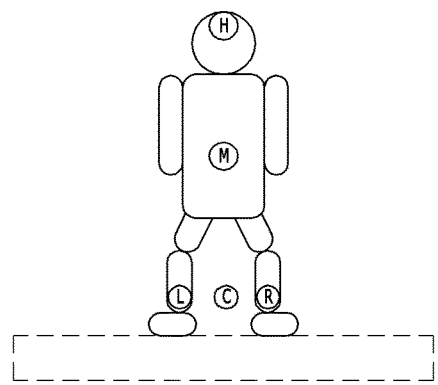

Subsequently, in step S560, when the condition of step S550 is satisfied, the user posture may be finally recognized as the bending knees posture illustrated in FIG. 6C and a series of procedures of recognizing the bending knees posture may end.

Figure 7:
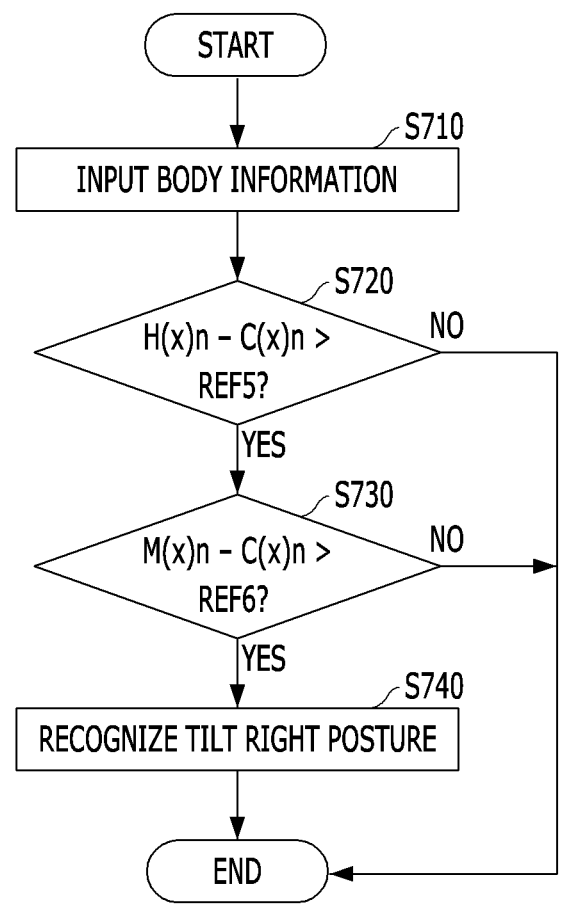
FIG. 7 is a flowchart illustrating a tilt right posture recognizing operation performed by the posture recognizer illustrated in FIG. 1.

FIG. 7 is a flowchart illustrating a tilt right posture recognizing operation performed by the posture recognizer illustrated in FIG. 1.

Referring to FIG. 7, in step S710, body information at a current time may be input.

Subsequently, in step S720, whether a difference value "$H(x)_n-C(x)_n$" between an x coordinate value "$H(x)_n$" of a coordinate value "$H_n$" of H at the current time and an x coordinate value "$C(x)_n$" of a coordinate value "$C_n$" of C at the current time is a positive number and is more than a fifth reference value "REF5" may be determined. Here, the fifth reference value "REF5" may be a constant value representing a predetermined allowable error. When a condition of step S720 is not satisfied, it may be determined that a user posture is not the tilt right posture, and the tilt right posture recognizing operation may end.

Subsequently, in step S730, when the condition of step S720 is satisfied, whether a difference value "$M(x)_n-C(x)_n$" between an x coordinate value "$M(x)_n$" of a coordinate value of $M_n$ at the current time and the x coordinate value "$C(x)_n$" of the coordinate value "$C_n$" of C at the current time is a positive number and is more than a sixth reference value "REF6" may be determined. Here, the sixth reference value "REF6" may be a constant value representing a predetermined allowable error. When a condition of step S730 is not satisfied, it may be determined that a user posture is not the tilt right posture, and the tilt right posture recognizing operation may end.

Figure 9A:
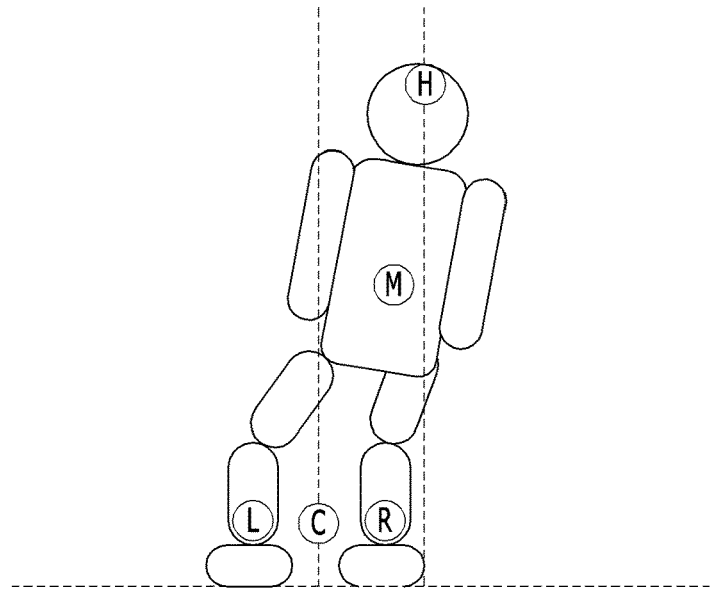
FIGS. 9A and 9B are a diagram schematically illustrating a tilt right posture and a tilt left posture recognized by the posture recognizer illustrated in FIG. 1.

Subsequently, in step S740, when the condition of step S730 is satisfied, the user posture may be finally recognized as the tilt right posture illustrated in FIG. 9A, and a series of procedures of recognizing the tilt right posture may end.

Figure 8:
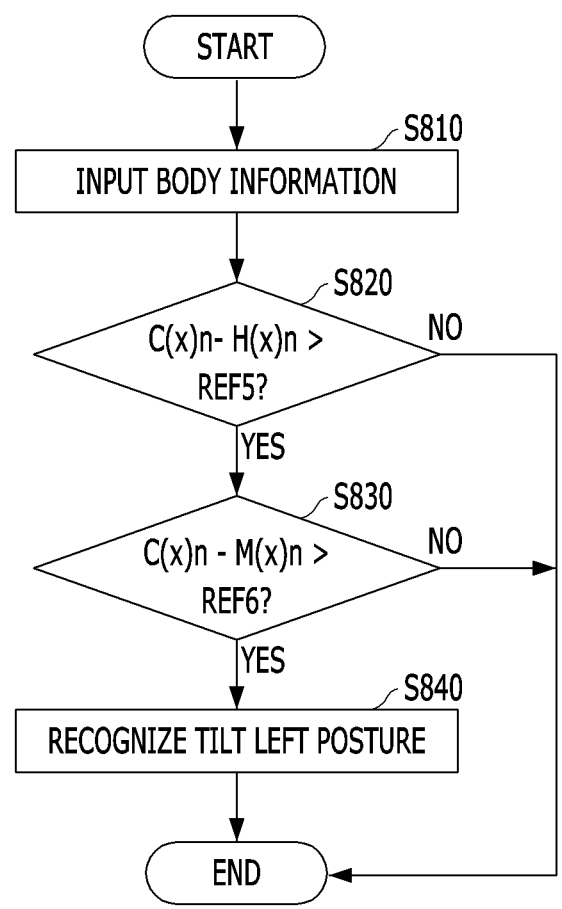
FIG. 8 is a flowchart illustrating a tilt left posture recognizing operation performed by the posture recognizer illustrated in FIG. 1.

FIG. 8 is a flowchart illustrating a tilt left posture recognizing operation performed by the posture recognizer illustrated in FIG. 1.

Referring to FIG. 8, in step S810, body information at a current time may be input.

Subsequently, in step S820, whether a difference value "$C(x)_n-H(x)_n$" between an x coordinate value "$C(x)_n$" of a coordinate value "$C_n$" of C at the current time and an x coordinate value "$H(x)_n$" of a coordinate value "$H_n$" of H at the current time and is a positive number and is more than the fifth reference value "REF5" may be determined. When a condition of step S820 is not satisfied, it may be determined that a user posture is not the tilt left posture, and the tilt left posture recognizing operation may end.

Subsequently, in step S830, when the condition of step S820 is satisfied, whether a difference value "$C(x)_n-M(x)_n$" between the x coordinate value "$C(x)_n$" of the coordinate value "$C_n$" of C at the current time and an x coordinate value "$M(x)_n$" of a coordinate value of $M_n$ at the current time is a positive number and is more than the sixth reference value "REF6" may be determined. When a condition of step S830 is not satisfied, it may be determined that a user posture is not the tilt left posture, and the tilt left posture recognizing operation may end.

Figure 9B:
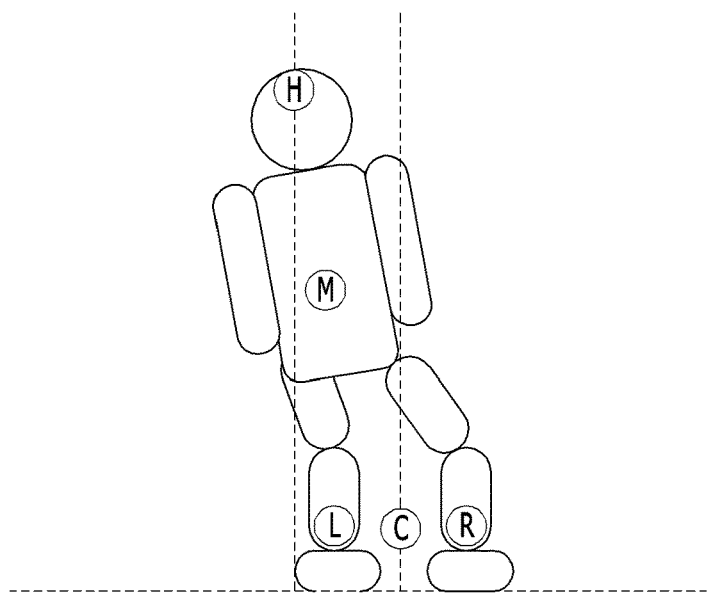

Subsequently, in step S840, when the condition of step S830 is satisfied, the user posture may be finally recognized as the tilt left posture illustrated in FIG. 9B, and a series of procedures of recognizing the tilt left posture may end.

As describe above, according to the embodiments of the present invention, in order to recognize detailed postures of a user, detailed skiing postures such as a stand posture, a bending forward posture, a bending knees posture, a tilt right posture, and a tilt left posture are recognized based on a variation between body information at a previous time and body information at a current time.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of recognizing user postures, the method performed by an apparatus having an image processor and a three-dimensional (3D) camera, the method comprising:
   extracting, from an image frame input through the 3D camera, body information including a two-dimensional (2D) coordinate value "H" representing a head position of a user, a three-dimensional (3D) coordinate value "M" representing a body middle position of the user, a 2D coordinate value "C" representing a center position between a left ankle position and a right ankle position of the user, a distance value "HM" from the head position of the user to the body middle position of the user, a distance value "HC" from the head position of the user to the center position between the left ankle position and the right ankle position of the user, and a distance value "MC" from the body middle position of the user to the center position "C" between the left ankle position "L" and the right ankle position "R" of the user; and
   recognizing a posture of the user, based on the body information sequentially extracted in units of image frames from the 3D camera.

2. The method of claim 1, wherein the recognizing of the posture comprises:
   (A) determining whether a value obtained by summating a first HC input at a $n^{th}$ time and a first reference value is less than a second HC input at a $n-1^{th}$ time;
   (B) determining whether a value obtained by summating a z coordinate value of a first M input at the $n-1^{th}$ time and a second reference value is less than a z coordinate value of a second M input at the $n^{th}$ time;
   (C) determining whether a value obtained by summating a first HM input at the $n^{th}$ time and a third reference value is less than a second HM input at the $n-1^{th}$ time;
   (D) determining whether an absolute value of a difference value between a first MC input at the $n-1^{th}$ time and a second MC input at the $n^{th}$ time is equal to or less than a fourth reference value; and
   (E) when steps (A), (B), (C), and (D) are all satisfied, recognizing the posture of user as a bending forward posture.

3. The method of claim 1, wherein the recognizing of the posture comprises:
   (A) determining whether a value obtained by summating a first HC input at a $n^{th}$ time and a first reference value is less than a second HC input at a $n-1^{th}$ time;
   (B) determining whether a value obtained by summating a z coordinate value of a first M input at the $n^{th}$ time and a second reference value is less than a z coordinate value of M input at the $n-1^{th}$ time;
   (C) determining whether an absolute value of a difference value between a first HM input at the $n-1^{th}$ time and HM input at the $n^{th}$ time is equal to or less than a third reference value;
   (D) determining whether a value obtained by summating a first MC input at the $n^{th}$ time and a fourth reference value is less than a second MC input at the $n-1^{th}$ time; and
   (E) when steps (A), (B), (C), and (D) are all satisfied, recognizing the posture of user as a bending knees posture.

4. The method of claim 1, wherein the recognizing of the posture comprises:
   (A) determining whether a difference between an x coordinate value of an H input at a $n^{th}$ and an x coordinate value of a C input at the $n^{th}$ time is a positive number and is more than a fifth reference value;
   (B) determining whether a difference between an x coordinate value of an M input at the $n^{th}$ time and the x coordinate value of the C input at the $n^{th}$ time is a positive number and is more than a sixth reference value; and
   (C) when steps (A) and (B) are all satisfied, recognizing the posture of user as a tilt right posture.

5. The method of claim 1, wherein the recognizing of the posture comprises:
   (A) determining whether a difference between an x coordinate value of a C input at a $n^{th}$ time and an x coordinate value of H input at the $n^{th}$ time is a positive number and is more than a fifth reference value;
   (B) determining whether a difference between the x coordinate value of the C input at the $n^{th}$ time and an x coordinate value of an M input at the $n^{th}$ time is a positive number and is more than a sixth reference value; and
   (C) when steps (A) and (B) are all satisfied, recognizing the posture of user as a tilt left posture.

6. An apparatus for recognizing user postures, the apparatus comprising:
   a three-dimensional (3D) camera configured to take an image of a user; and
   an image processor configured to extract body information from the image, the body information including a two-dimensional (2D) coordinate value "H" representing a head position of a user, a 3D coordinate value "M" representing a body middle position of the user, a 2D coordinate value "C" representing a center position between a left ankle position and a right ankle position of the user, a distance value "HM" from the head position of the user to the body middle position of the user, a distance value "HC" from the head position of the user to the center position between the left ankle position and the right ankle position of the user, and a distance value "MC" from the body middle position of the user to the center position "C" between the left ankle position "L" and the right ankle position "R" of the user; and a posture recognizer configured to sequentially receive body information in units of image frames from the image processor and recognize a posture of the user, based on the body information.

7. The apparatus of claim 6, wherein the posture recognizer recognizes one of a bending forward posture, and a bending knees posture, based on a variation of the HC, a variation of the M, a variation of the HM, and a variation of the MC, and the posture recognizer recognizes one of a tilt right posture and a tilt left posture, based on a difference value between an x coordinate value of the H and an x coordinate value of the C and a difference value between an x coordinate value of the M and the x coordinate value of the C.

* * * * *